United States Patent [19]
Leiter et al.

[11] 4,118,719
[45] Oct. 3, 1978

[54] MICROSCOPE ATTACHMENT CAMERA

[75] Inventors: Herbert Leiter, Wetzlar; Günter Reinheimer, Biebertal, both of Fed. Rep. of Germany

[73] Assignee: Ernst Leitz Wetzlar GmbH, Wetzlar, Fed. Rep. of Germany

[21] Appl. No.: 792,852

[22] Filed: May 2, 1977

[30] Foreign Application Priority Data
May 5, 1976 [DE] Fed. Rep. of Germany ....... 2619853

[51] Int. Cl.[2] .................. G03B 17/48; G02B 21/00
[52] U.S. Cl. .................................... 354/79; 350/19
[58] Field of Search .................. 350/19; 354/76, 79

[56] References Cited
U.S. PATENT DOCUMENTS

| 3,633,482 | 1/1972 | Tsuda | 354/79 X |
| 4,006,487 | 2/1977 | Allen | 354/79 |
| 4,057,318 | 11/1977 | Schindl | 350/19 |

*Primary Examiner*—Donald A. Griffin
*Attorney, Agent, or Firm*—Gilbert L. Wells

[57] ABSTRACT

Microscope-attachment camera with a system for measuring the brightness of an object detail and with markings for indicating at least the detail metering-field and the image-field of the camera in the observation beam. The metering field-marking (14) and the image field-marking (22) are positioned on two separate plates, the metering field-marking plate being designed as a metering field-stop (14), and the two markings which differ in shape and size (14,22) are simultaneously reflected into the observation beam.

10 Claims, 6 Drawing Figures

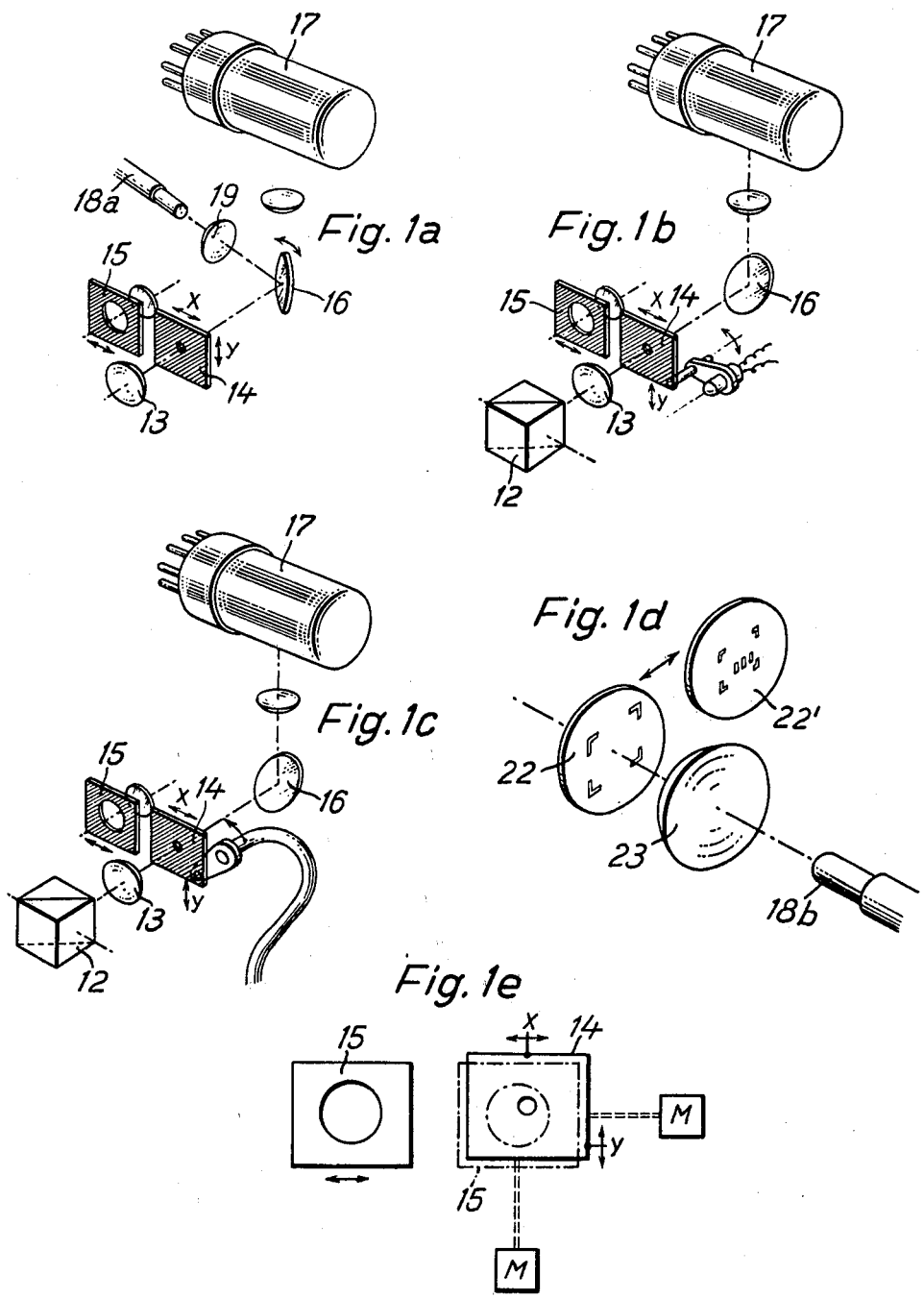

MICROSCOPE ATTACHMENT CAMERA

CROSS-REFERENCE TO A RELATED APPLICATION

Applicants claim priority under 35 USC 119 for application P 26 19 853.8 filed May 5, 1976 in the Patent Office of the Federal Republic of Germany.

BACKGROUND OF THE INVENTION

The present invention relates to a miscroscope-attachment camera with exposure-metering for the photographic recording of an object or detail of same.

It is known with regard to such cameras to carry out integrated measurements of object-brightness over the entire image field; and furthermore, it is also known to selectively measure the brightness of a given image detail.

To convey to the observer the image field on the one hand, and to inform him on the other which partial domain therein is measured with respect to brightness in the case of detailed metering, it is known to mirror or reflect both markings of the image field and markings of the detailed partial domain into the observation beam. Therefore, the image-field markings and centrally therein the measured domain markings have been arranged to that end on a common support plate from which these markings are reflected into the observation beam. Such a prior art device, the disclosure of which is incorporated herein is disclosed in the LEITZ-Prospect No. 540/36b/Engl. (April 1975): "The LEITZ System Camera".

However, it is a drawback of this device that the measuring spot for the detailed metering is fixed in the center of the image field. This means, in the case where the desired detail is off center, that one must point at the object in such a manner that initially the desired detail falls into this center. If this drawback is to be eliminated, it is obvious to shift the metered-field markings and the measuring beam in lieu of the object, as is done in exposure meters.

The problem encounted in this respect however is to carry out the shifting so that the image-field marking retains its position and only the metered field or its marking is displaced.

SUMMARY OF THE INVENTION

Having in mind the limitations of the prior art, it is an object of the present invention to carry out the shifting so that the image-field marking retains its position and only the metered field or its marking is displaced.

This object is achieved by the present invention by mounting the metered-field markings and the image-field markings on two separate plates, where the meter-field markings-plate is designed as the metered-field stop, and where the two markings which differ in shape and size are simultaneously reflected into the observation beam.

Appropriately a special projector is provided for each marking, these markings however being illuminated by a common light source according to a further embodiment of the present invention.

For the purpose of allowing integrated measurements in addition to detailed ones, it is contemplated to make the metered-field stop forming the metered-field marking interchangeable with a stop of the same kind but of different dimensions. Various embodiments are proposed for this solution of the invention. For instance, the plate bearing the image-field marking may be interchangeable with another holding other numbers or symbols superposed on the microscope-image and therefore, viewed and photographed at the same time.

Again, the system of the present invention may be designed so that the plate bearing the metered-field stop may be moved in a manner known per se in two orthogonal coordinates and may be exchanged against a plate holding a stop of the same kind but of different dimensions. This plate obviously must be fixed. On the other hand, it is a characteristic of the present invention that the adjustable metered-field stop-plate always retains its set position in the coordinates when there is a plate exchange. Remote operating means are provided if desired for such adjustments and displacements.

Again various embodiments are conceivable for the illumination of the above inserted stop-plate and image-field marking-plate. The concept basically is to provide a separate projector for each plate, which however will be illuminated by a common light source. This illumination may come from known light-guides or fiber optics such as disclosed in U.S. Pat. Nos. 2,825,260; 2,992,516 and 3,581,099. However, only the image-field marking might be illuminated from a projector, while the metered-field stop might be illuminated by a light-emitting diode which may be adjusted together with the metered-field stop-plate and shut-off during the metering process.

Similarly the projection means for the illumination of the metered-field stop may be omitted and the front face of the light-emitting light-guide or fiber optic may be placed directly behind the metered-field stop-aperture. The end of the light-guide or fiber optic in such a case being adjustable in common with the metered-field stop-plate and being pivotable during the measurement process.

Again, the brightness of the light source may be varied so that the brightness of the image of the stop-marking or of the metered-field marking may be made equal to that of the object so as to prevent stray illumination.

BRIEF DESCRIPTION OF THE DRAWING

Other features of embodiments of the present invention which are provided by way of example will become apparent from the following detailed description thereof made with reference to the accompanying drawings, wherein:

FIG. 1a is a modification of FIG. 1 showing rotating mirror 16 in a second end position;

FIG. 1b shows a variation in the illumination of the metering field stop 14 which uses a hinged diode;

FIG. 1c shows a further variation in the illumination of the metering field stop 14 which uses a hinged light projector 18a;

FIG. 1d shows the interchangeable image-field markings 22 and 22'; and

FIG. 1e shows the interchangeable integrating metering field-stop 15 and the detail metering field-stop 14 with the motorized drives M indicated.

DESCRIPTION OF THE PREFERRED EMBODIMENTS

Figure 1:
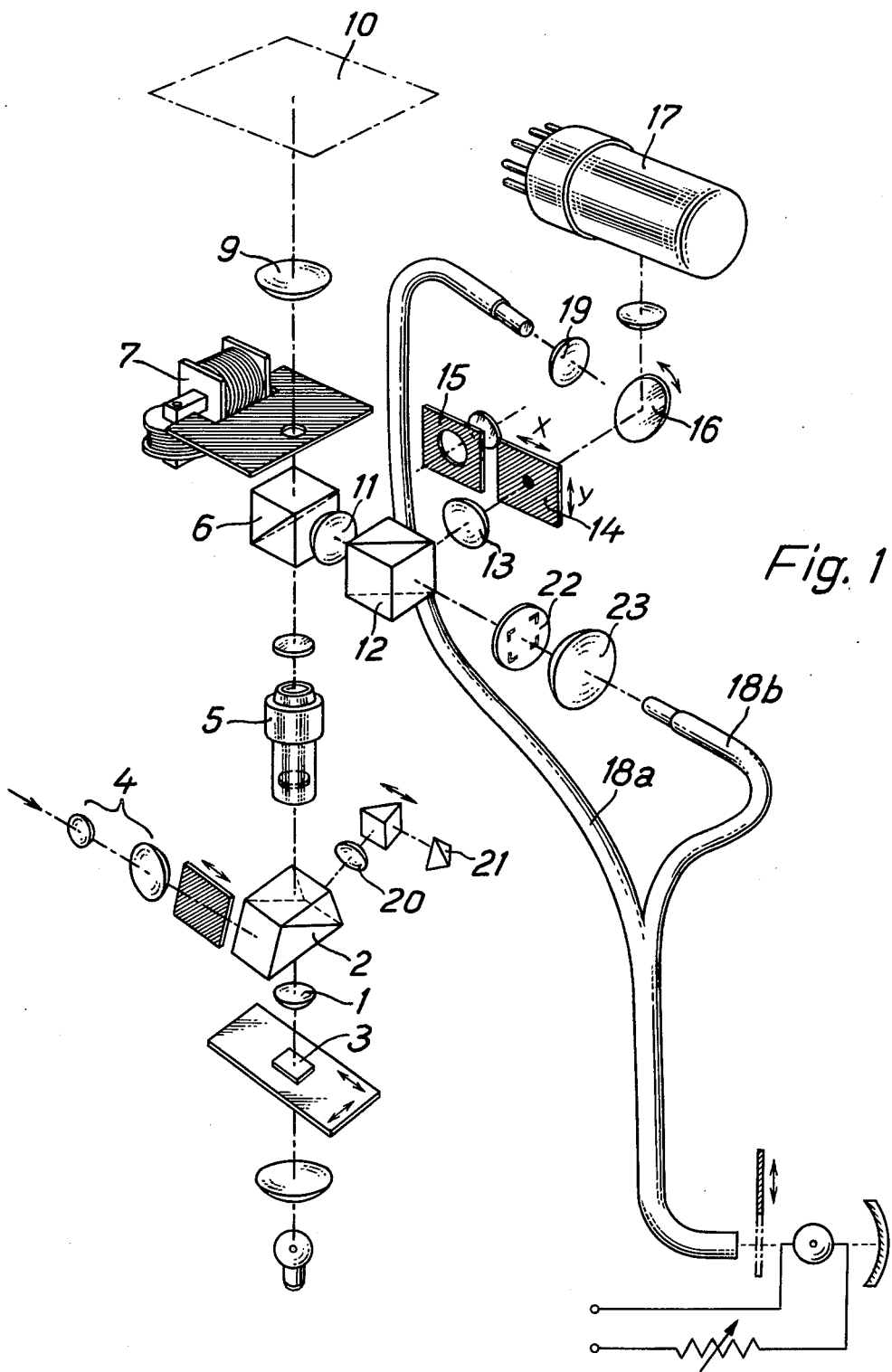
FIG. 1 is a perspective, diagrammatic view of the present invention showing rotating mirror 16 in a first end position.

With particular reference to FIG. 1, a beam-splitter 2 is shown mounted above a microscope objective 1, reflecting the rays from objective 3 partly into ocular 4. This beam is the observation beam proper.

That part of the beam passing through splitter 2 arrives at a photographic ocular 5 and from there passes through a splitter-cube 6 and a camera shutter 7 into a camera objective 9 and to film plane 10 and this is the imaging beam proper.

A metering beam is split off at splitter-cube 6, which passes through an objective 11, a further splitter-cube 12, a field lens 13 and a metering field-stop 14. Field-stop 14 is the stop for the detail metering and is displaceable in two coordinates. Next to it is mounted a further field-metering stop 15 for the integrated measurement, which is selectively exchangeable with metering field-stop 14. The integrating metering field-stop 15 is not displaceable along the coordinates when switched into the operating position as is field-stop 14.

The metering beam beyond metering field-stop 14 impinges on a rotating mirror 16 which is pivotable into two end positions. In the first of these positions shown in FIG. 1, the metering beam is reflected to a light detector 17, for instance a secondary electron multiplier. This first position simultaneously is used to cover or stop an illumination beam described further below, so that no stray light reaches the light detector during the measurement process. This first mirror position is the embodiment furthermore for the integrating metering field-stop 15 in operational position. This prevents superposing this integrating metering field-stop on the microscope image in observation ocular 4, which would interfere with the observation process.

When in the other or second end position, as shown in FIG. 1a, rotating mirror 16 reflects an illumination beam from the rear to metering field-stop 14. The light from that beam is obtained from a source as shown in FIG. 1a and is branched off there by means of a light-guide or fiber optic 18a. The end of this guide or fiber is opposite a field lens 19 projecting the guide's or fiber's emitted beam by means of rotating mirror 16 onto the metering field-stop. A first image of the metering field-stop is projected through field lens 13, splitter-cube 12, objective 11 and splitter-cube 6 into the imtermediate image plane of photographic ocular 5. The beam thereafter passes to the reflection surface of beam-splitter 2, then through a lens 20 and by means of a triple reflector 21 again through lens 20 and beam-splitter 2 into ocular 4, where a second image of the metering field-stop is generated. Super-position of this image of the metering field-stop with the object image allows the observer to know from which detail of the object light passes through metering field-stop 14 to light detector 17 when rotating mirror 16 is moved into its other end position.

A reticle 22 is mounted next to splitter-cube 12 with the markings making the image-field visible. This stationary reticle is illuminated from the rear through a field lens 23 by means of a light-guide or fiber optic 18b from the same light source also illuminating metering field-stop 14. An image of the reticle-marking is also formed in ocular 4. The imaging rays from splitter-cube 12 follow the same path as those rays imaging the metering field-stop, that is, they go through objective 11, splitter-cube 6, photographic ocular 5, beam-splitter 2, lens 20 and triple reflector 21.

Therefore, the simultaneous but separate reflection of two markings differing in shape and size allow displacing one of the markings (namely the metering field-stop), while the other marking (namely the image-field) boundary remains fixed.

We claim:

1. In a microscope-attachment camera having an observation beam with a system for measuring the brightness of an object detail and with markings for indicating at least the detail metering-field and the image-field of the camera in said observation beam, the improvement:

a metering field-marking (14) positioned on a first plate and an image field-marking (22) positioned on a second plate, said first plate defined by a metering field-stop (14), said metering field-marking and said image field-marking differing in shape and size (14, 22) and being simultaneously reflected into said observation beam.

2. The attachment-camera of claim 1, wherein said second plate bearing said image-field marking (22) is interchangeable with a third plate bearing arbitrary different markings, superposed in the microscope image, visible in the ocular and photographed together with the actual object in image plane (10).

3. The attachment-camera of claim 1, wherein said first plate bearing said metering field-marking (14), is adjustable in two coordinates and is interchangeable with a fixed plate bearing a stop of the same kind but of different size, and said first plate bearing said metering field-marking (14) remains in position with respect to its coordinates when an exchange takes place.

4. The attachment-camera of claim 3, wherein means for remote operation are provided to adjust said first plate bearing said metering field-marking (14) with respect to its coordinates.

5. The attachment-camera of claim 1, wherein a special projector (18a; 19 and 18b; 23) is provided for the illumination of each of said metering field stop (14) and said image-field marking (22).

6. The attachment-camera of claim 5, wherein a common light-cource is provided for the illumination of said metered field stop (14) and for said image-field marking (22).

7. The attachment-camera of claim 6, wherein said light-source is mounted separately from a light-detector (17).

8. The attachment-camera of claim 7, wherein said light-source is adjustable in its brightness so as to match the brightness of said metering field stop (14) and of said image-field marking (22) with that of the microscope image.

9. The attachment-camera of claim 1, wherein a light-emitting diode is provided for the illumination of said metering field stop (14), said diode displaceable with said stop in the two coordinates and is shut off during the measuring process, and a projector is provided for the illumination of said image-field marking (22).

10. The attachment-camera of claim 1, wherein a light-guide or fiber optic is provided for the illumination of the metered field stop (14), said guide or optic having a front face opposite said metered field stop and being movable together with it in two coordinates, and a projector is provided for said image-field marking (22).

* * * * *